United States Patent [19]

Solano et al.

[11] Patent Number: 4,887,705
[45] Date of Patent: Dec. 19, 1989

[54] AUTOMATIC LENGTH ADJUSTER FOR CONTROL CABLES, AND CONTROL CABLE PROVIDED THEREWITH

[75] Inventors: Victorino S. Solano; Antonio S. Trilla, both of Barcelona, Spain

[73] Assignee: Pujol Y Tarrago, S. A., Barcelona, Spain

[21] Appl. No.: 252,439

[22] Filed: Sep. 30, 1988

[30] Foreign Application Priority Data

Oct. 9, 1987 [ES] Spain ............................ 8702893

[51] Int. Cl.$^4$ .................... F16D 13/75; F16D 65/38
[52] U.S. Cl. .................... 192/111 A; 188/196 B; 74/501.5 R
[58] Field of Search ............ 192/111 A; 188/196 B; 74/501.5 R

[56] References Cited

U.S. PATENT DOCUMENTS

| | | | |
|---|---|---|---|
| 4,304,322 | 12/1981 | Beclaris | 192/111 A |
| 4,598,804 | 7/1986 | Glover et al. | 188/196 B |
| 4,690,262 | 9/1987 | Hoyle | 188/196 B |
| 4,717,004 | 1/1988 | Hoyle | 192/111 A |
| 4,753,123 | 6/1988 | Stormont | 188/196 B |
| 4,787,263 | 11/1988 | Jaksic | 192/111 A |
| 4,799,400 | 1/1989 | Pickell | 192/111 A |

Primary Examiner—Rodney H. Bonck
Assistant Examiner—Nicholas Whitelaw
Attorney, Agent, or Firm—Michael J. Striker

[57] ABSTRACT

A vehicle clutch control cable comprises a primary cable part, a secondary cable part, and a length adjuster interposed between the cable parts for automatically adjusting the effective length of the control cable with changes in the position of a clutch member controlled by the cable, the length adjuster including an elongated body including two ends and provided with an opening in one of the ends for passing the primary cable part and an opening in the other of the ends for passing the secondary cable part, interconnecting members located in the body and interconnecting the cable parts to allow a control force applied to the primary cable part to be transmitted through the secondary cable part to the member in use, and a compensation spring acting on the interconnecting means to automatically vary the position of an interconnection of the cable parts with respective changes in the position of the member.

9 Claims, 1 Drawing Sheet

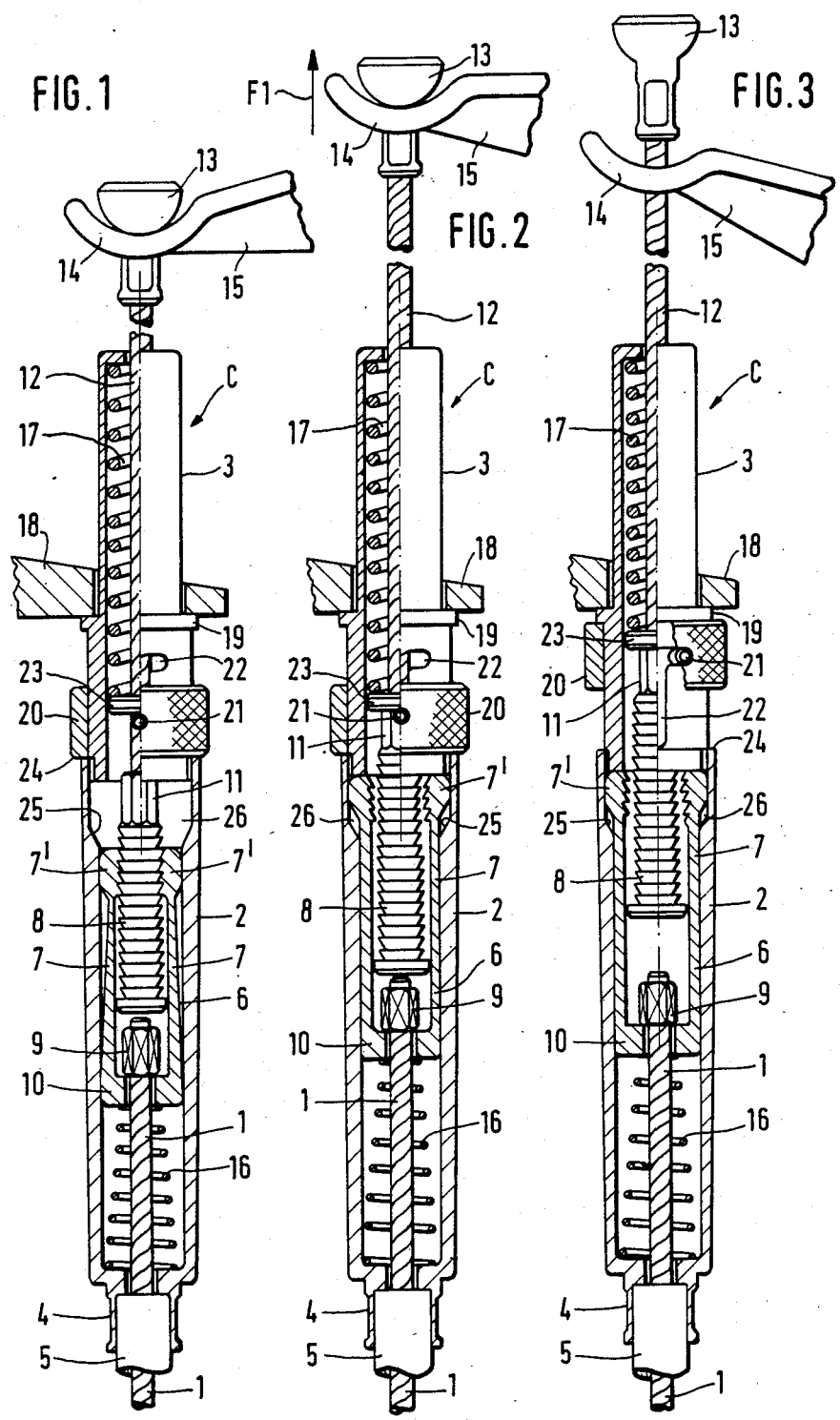

4,887,705

AUTOMATIC LENGTH ADJUSTER FOR CONTROL CABLES, AND CONTROL CABLE PROVIDED THEREWITH

BACKGROUND OF THE INVENTION

The present invention relates to a device for automatically adjusting the length of a control cable which operates a mechanical member subjected to dimensional wear, particularly in cases in which the wear affects the operation of a fixed-length control cable.

The above mentioned wear occurs in cables which are used for operating motor vehicle clutches where, because of their extremely frequent use, the anti-slip linings of the clutch discs experience progressive wear. This in turn causes a decrease in the pressure exerted on the movable members, with the result that their capacity to transmit drive to the wheels is seriously impaired. It involves a consequent risk of impairing the performance of the vehicle whose engine loses pulling and braking capacity and very quickly reaches a situation in which considerable repairs are necessary.

It is well known that the clutch control cable has a flexible tubular casing or sheath formed by a tight metal coil which adapts easily to the irregularly shaped compartments of motor vehicle engines, and a thin steel cable which can slide longitudinally in both directions within it. When the control cable is fitted along a curved path and the casing is prevented from moving longitudinally relative to the inner cable, traction or thrust can be transmitted along the path. In order to avoid the harmful effects of wear on the clutch discs, the effective length of the clutch cable should be adjusted continually, either by lengthening of the cable or by shortening of its sheath, so as to compensate for the effects of the wear. The clutches used in the majority of motor vehicles are disc clutches and in general they are associated with a fly wheel which is fixed to the crank shaft of the gear box. They are provided with a spring or springs which keep a pressure plate fitted loosely on the shaft, tight against the outer face of the fly wheel. The driven disc is situated between the fly wheel and the plate and slides on the same gear box shaft. It is gripped between them to transmit the rotation of the engine of the gear box shaft.

In the case in question, the control cable transmits the movement of the clutch pedal to the clutch operating lever which disconnects the engine from the gear box, overcoming the force of the spring or springs which keep the pressure plate, the driven disc and the fly wheel under pressure. The clutch is disengaged to allow gear changing to take place and then reengaged to enable the rotation of the engine to be transmitted to the gear box and the wheels. It is during this clutch reengagement, which is carried out particularly frequently that wear of the anti-slip lining of the disc takes place. As a result, when the wear reaches a certain value, the control cable becomes tensioned so that it has a constant, fixed length and the pressure plate fails to exert the required pressure on the clutch disc. This starts to slip more easily each time and its wear increases progressively, until it fails to fulfill its function of transmitting the rotation of the shaft to the gear box, thereby causing considerable problems and inconvenience, and potentially putting the vehicle and its occupants into dangerous situations. This fault should be rectified before it reaches this extreme condition either by modification of the active length of the control cable if this is possible, or by replacement of the worn driven disc. In both cases, additional expenses and inconveniences are caused to the user.

SUMMARY OF THE INVENTION

Accordingly, it is an object of the present invention to provide a device for length adjustment, which enables the length of a control cable, particularly a clutch cable, to be automatically adjusted, and which at the same time is simple to assemble and fit, has a relatively small number of parts and bulk so as to enable it to be fitted to comparatively small spaces such as small motor cars.

In keeping with these objects and with others which will become apparent hereinafter, one feature of the present invention resides, briefly stated, in a length adjuster for automatically adjusting the effective length of a control cable including a primary cable and a secondary cable, with changes in the position of a member controlled by the cable wherein the adjuster has an elongated hollow body which can include rigidly and releasably interconnected main part and closure part each having an apertured end for passing the primary cable and the secondary cable with means in the main part for anchoring the end of the sheath of the primary cable, interconnecting means located in the body for interconnecting the cables to allow a control force applied to the primary cable to be transmitted to the member through the secondary cable, and a compensation spring which acts on the interconnecting means to automatically vary the position of an interconnection with respective changes in the position of the member. The adjuster is particularly intended for use with a vehicle clutch cable, but is adaptable with little or no alteration to other similar applications. The invention also relates to a two-part control cable, particularly a clutch cable, which incorporates such an adjuster.

In use with a vehicle clutch cable, the adjuster is assembled at the free end of the primary cable which is connected to the clutch pedal, while the secondary cable which projects beyond the opposite of the adjuster body from the primary cable may be provided with an end member, such as a part-spherical head, for engagement in a usual curved forked end of the gear box lever which operates the clutch. The adjuster body is preferably provided with a cooperating part for engagement with a bracket of the gear box housing to support it in its position of use.

For allowing the adjuster and its control cable to be fitted easily in a motor vehicle since has the cable has to be fitted with a certain initial tension in order to function properly, the adjuster in accordance with another feature of the present invention preferably includes a releasable mechanism for retaining the compensation spring in a condition in which the clutch cable has a maximum extent beyond the body. The slack that this provides in the control cable can then be taken up by release of the retaining mechanism.

In accordance with a preferred embodiment of the invention, the adjuster body is cylindrical, and the compensation spring is formed as a compression spring which coaxially surrounds the secondary cable and acts at one end against an end of the closure body part and provided at its opposite end with an abutment head. The above mentioned retaining mechanism has a radial pin which is engageable with the abutment head and movable in an L-shaped slot in the body by means of a ring which is slidable and rotatable outside of the body. The slots has a circumferentially extending arm closer to the apertured end of the closure part, in which the pin can be engaged to retain the compression spring in a compressed position in which the cable has the maximum extent. The circumferential portion of the slot communicates with the axially extending arm in which the pin is slidable to allow the spring to extend from its compressed position.

The adjuster can be first in the locked condition in which the pin of the retaining ring is located in the circumferential arm of the L-shaped slot. Thereby the compensation spring is compressed and a greater length of the secondary clutch cable is available projecting from the adjuster than in the normal operating condition.

In accordance with another preferred feature of the present invention, the interconnecting means includes a tubular clamp connectable with one of the cable parts and having a plurality of axially extending internally toothed clamping segments, and an externally toothed rod connectable with the other of the cable parts. The externally toothed rod is located coaxially within the tubular clamp, and the clamping segments are compressible radially into engagement with the toothed rod to connect the two cables together.

In accordance with a further feature of the present invention, the tubular clamp is preferably connected with the primary cable and is biased toward its disconnected position by a conical compression spring which acts between the tubular clamp and the apertured end of the main body part in which it is located. The toothed rod is connected with the secondary cable within the closure body part, and when the spring retaining mechanism is released is subject to the opposing actions of the compression spring which urges it further into the clamp and the tension in the secondary cable connected to the gear box lever which tends to draw it out of the clamp. As the position of the gear box lever changes with increased wear of the clutch lining, the position of the rod relative to the clamp will change automatically to achieve the automatic adjustment of the length adjuster in accordance with the present invention.

The tubular clamp can be engaged with the toothed rod by any suitable means, but preferably by means of the internal toothing provided on the free end portions of the segments which have a larger external diameter than the remaining major part of the clamp. These end portions are located in a wider portion of the body cavity at its end connected to the closure part, when the clamp is disengaged from the rod. The wider cavity portion is connected to the major narrower body cavity through an inclined shoulder so that a pull on the primary cable connected to the tubular clamp draws to the toothed portions of the clamp into the narrow cavity portion, so that their external surfaces engage the inclined shoulder of the body to force the ends together and into engagement with the toothed rod. The adjuster in accordance with the present invention can interconnect the primary and secondary clutch cables to provide a cable which is very strong in tension, and at the same time is of a variable length.

The accommodation of the device in the tubular body makes it very compact, enabling it to be fitted in even small vehicles, while the connecting mechanism which has two toothed members and the cooperating part of the casing is simple and enables the device to be put in practice with a comparatively small number of parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partially sectioned of an automatic adjusting device in an extreme operating position in which the engine is disengaged;

FIG. 2 is a view substantially corresponding to the view of FIG. 1 showing the automatic adjusting device in an initial condition in which the engine is engaged;

FIG. 3 is a view substantially corresponding to the view of FIGS. 1 and 2, and showing the automatic adjusting device in a condition in which its internal members are arranged in a position for assembly on the free end of the clutch lever.

DESCRIPTION OF A PREFERRED EMBODIMENT

An automatic adjusting device in accordance with the present invention shown in the drawings is used for adjusting a vehicle clutch cable which includes a primary cable 1 and a secondary cable 12. The device is arranged at the free end of the primary cable 1 and includes a hollow body C with a main body part 2 and a closure body part 3 connected with one another for example by a screw coupling. The ends of the hollow body C are provided with openings for passing the clutch cable. The main body part 2 has an end with an opening for the primary cable 1. This end is formed by an end member 4 for accommodating the end of a sheath 5 of the primary cable 1. The closure body part 3 is provided with an opening for passing the secondary clutch cable 12.

An axially extending hollow clamp member 6 is located in the main body part. It has a base 10 provided with an opening at its end which faces the end member 4. The end of the primary cable 1 extends through the opening of the base 10 and is fixed by an end member 9 located within the clamp member 6. The clamp member 6 has resiliently flexible segments 7 with free ends 7' which face away of the base 10 and are provided with internal saw teeth.

An externally toothed rod 8 is partially located within the clamp member 6, and its teeth are intimately engageable with the teeth of the toothed ends 7' of the segments 7. The end of the toothed rod 8 which projects beyond the main body part 2 is connected to an end member 11 of the secondary cable 12 which is located in the closure part 3. The opposite end of the cable 12 outside the closure part 3 terminates in an end member 13 with a rounded body suitable for insertion and housing in a forked end 14 of a gear box lever 14 for operating a not shown clutch.

The clamp member 6 is permanently biased away from the end member 4 by a conical spring 16 which is located between the base 10 and the inner end of the main body 2 so that the primary cable 1 is normally under tension. Also normally ends 7' of the segments 7, which are thicker in the radial section than the segments 7, are situated in the main body 2 in a space of a larger diameter and are circumferentially slightly spaced from each other and disengaged from the toothed rod 8. The toothed rod 8 is acted upon by the secondary cable 12 which in the assembled condition of the adjuster is tensioned to bias the toothed rod upwardly as seen in the drawings, in direction of the arrow $F_1$. It is also biased by the counter force exerted by a compression spring 17 which is located within the closure part 3 coaxially around the cable 12. The spring 17 acts at one end against the closed end of the closure part 3 and at its opposite end has a head 23 which bears against the end member 11.

In order to allow the installation of the adjuster in a vehicle, a support flange 18 with a splined aperture is provided on the gear box block. The closure part 3 extends with a respective fit through an opening of the support flange 18 and has a projecting shoulder or collar 19 which abuts against the lower surface of the flange 18 in the assembled position. Furthermore, in order to facilitate the assembly, a mechanism is provided for retaining the secondary cable 12 in a position in which it extends to its maximum extent outside the body C, so that its end member 13 can be easily engaged in the forked end 14 of the lever 15.

The retaining mechanism includes a retaining ring 20 which is rotatable and slidable on the outer surface of the closure body 3. It is guided by a pin 21 which extends from the ring 20 through an L-shaped slot 22 in the closure body 3 and engages the surface of the head 23 at its lower surface which is opposite to the spring 17. The retaining ring 20 with the pin 21 can be located in a circumferentially extending arm of the slot 22 which faces the closed end of the closure body 3 to keep the spring 17 compressed and to allow the cable 12 to project beyond the body C as shown in FIG. 3. From this position the ring 20 can be turned until the pin 21 is in an axially extending arm of the slot 22 and can slide away of the closed end of the body 3 to allow the spring 17 to extend. When the spring 17 extends, it acts on the ring 20 through the pin 21 and causes it to slide until it abuts against an end edge 24 of the main body part 2. In this assembled condition of the adjuster the strength of the compensation spring is such as to allow the gear box lever to take up an initial working condition shown in FIG. 2, the clutch is engaged, and a portion of the toothed rod 8 faces the toothed ends 7' of the segments 7 but is disengaged therefrom.

FIG. 1 shows the condition of the automatic adjuster in accordance with the present invention, when the clutch is disengaged. In order to effect the disengagement, the primary cable 1 is pulled and the toothed ends 7' of the clamp segments 7 slide over an inclined surface of a shoulder 25 which connects a larger diameter opening 26 with a smaller diameter opening of the body 2. This forces the segments 7 to compress so that their teeth mesh with the teeth of the toothed rod 8. The opening of the body 2 is of such a diameter that the two meshed elements can slide therein without disengagement of their teeth, and a continuing pull of the cable 11 causes the meshed elements 7, 8 and with them the secondary cable 12 to pulled downwards as shown in the drawings. This in turn causes the clutch lever 15 to be operated as if the primary cable 1 and the secondary cable 2 were a single cable. When the clutch is reengaged the above sequence of events is reversed and the adjuster returns to the condition of FIG. 2.

When the clutch becomes worn, its springs act through the lever 15 to exert a pull on the secondary cable 12 and consequently on the rod 8 in the direction of the arrow $F_1$ against the action of the spring 17. This causes the rod 8 to be displaced in direction of the arrow $F_1$ so that a different portion of its toothed surface comes to face the toothed ends 7' of the clamping member 6. This displacement reestablishes the correct pressure of the clutch spring on the drive plate mounted on the gear box shaft, and represents an actual lengthening of a theoretical cable equivalent to that formed by the primary cable 1 and the secondary cable 12. Further wear of the plate will cause further displacement of the rod 8 in direction of the arrow $F_1$ so as to establish meshing of the teeth in the new position.

It will be understood that each of the elements described above, or two or more together, may also find a useful application in other types of constructions differing from the types described above.

While the invention has been illustrated and described as embodied in a length adjuster for automatically adjusting the effective length of a control cable, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A length adjuster for automatically adjusting an effective length of a control cable including a primary cable part and a secondary cable part, with changes in a position of a member controlled by the control cable, the length adjuster comprising an elongate hollow body including two ends and provided with an opening in one of said ends for passing the primary cable part and an opening in another of said ends for passing the secondary cable part; interconnecting means located in said elongate hollow body and interconnecting the primary and secondary cable parts to allow a control force applied to the primary cable part to be transmitted through the secondary cable part to the cable-controlled member; a compensation spring acting on said interconnecting means to automatically vary a position of an interconnection of the primary and secondary cable parts with respective changes in the position of the member; and releasable means slidable over said elongate hollow body for retaining said compensation spring in a condition in which the control cable has a maximum extent to facilitate assembly.

2. A length adjuster as defined in claim 1, wherein said interconnecting means includes a tubular clamp connected with one of the primary and secondary cable parts and having a plurality of axially extending internally toothed clamping segments, and an externally toothed rod connectable with another of the primary and secondary cable parts and partially and coaxially located in said tubular clamp, said segments of said tubular clamps being compressible radially so as to engage with said toothed rod and therefore connect the primary and secondary cable parts together.

3. A length adjuster as defined in claim 2, wherein said elongate hollow body has a cavity including a portion of a smaller diameter, a portion of larger diameter, and a tapered portion forming an inclined shoulder between said portions of said smaller and larger diameter, said tubular clamp having a major part with a predetermined external diameter resilient segments having a larger diameter than said diameter of said tubular major part of said clamp and having free end portions provided with an internal toothing, said end portions being arranged in said portion of said cavity with a larger diameter when said tubular clamp is disengaged from said toothed rod, said tubular clamp being slidable in said cavity so that said free end portions of said segments are drawn into said portion of said cavity with a smaller diameter, and external surfaces of said free end portions of said segments engaging said inclined shoulder to force said end portions together and into engagement with said toothed rod.

4. A length adjuster as defined in claim 2; and further comprising means for biasing said tubular clamp toward an disengaged position thereof and including a conical compression spring arranged in said elongate tubular body between said end with said opening for the primary cable part and said tubular clamp.

5. A length adjuster as defined in claim 2, wherein said toothed rod has an end which projects beyond said tubular clamp and is connectable to the secondary cable part, said end of an toothed rod bearing against said abutment head of said compensation spring.

6. A length adjuster for automatically adjusting an effective length of a control cable including a primary cable part and a secondary cable part, with changes in a position of a member controlled by the control cable, the length adjuster comprising an elongate hollow body including two ends and provided with an opening in one of said ends for passing the primary cable part and an opening in another of said ends for passing the secondary cable part; interconnecting means located in said elongate hollow body and interconnecting the primary and secondary cable parts to allow a control force applied to the primary cable part to be transmitted through the secondary cable part to the cable-controlled member; a compensation spring acting on said interconnecting means to automatically vary a position of an interconnection of the primary and secondary cable parts with respective changes in the position of the cable-controlled member; and a releasable mechanism for retaining said compensation spring in a condition in which the control cable has a maximum extent to facilitate assembly; said elongate hollow body being cylindrical and having an L-shaped slot with a circumferential arm and an axial arm extending from said circumferential arm in a direction away from said opening for passing the secondary cable part, said compensation spring being formed as a compression spring located coaxially with said elongate hollow body and having an end which acts on said end of said elongate hollow body which is provided with said opening for passing the secondary cable part, said compression spring having an opposite end provided with an abutment head, said releasable mechanism including a radial pin engageable with said abutment head and movably extending through said L-shaped slot, and a ring fixed to a free end of said pin and slidable and rotatable outside of said elongate hollow body to move said pin in said slot between a position in said circumferential arm in which said compression spring is retained in a compressed position thereof and the control cable has a maximum extent, and a position in said axial arm in which said spring is allowed to extend from the compressed position thereof.

7. A length adjuster as defined in claim 6, wherein said elongate hollow body has a main part and a closure part, said opening for passing said primary cable part being provided in said main part, said opening for passing said secondary cable part being provided in said closure part, said main part and said closure part being rigidly and releasably connected with one another.

8. A motor vehicle clutch control cable for controlling operation of a clutch operating member and comprising primary and secondary cable parts; and a length adjuster interposed between said primary and secondary cable parts for automatically adjusting an effective length of said control cable with changes in a position of the clutch member, said length adjuster including an elongate hollow body including two ends and provided with an opening in one of said ends for passing said primary cable part and an opening in another of said ends for passing the secondary cable part, interconnecting means located in said elongate hollow body and interconnecting said primary and secondary cable parts to allow a control force applied to the primary cable part to be transmitted through the secondary cable part to the cable-controlled member, a compensation spring acting on said interconnecting means to automatically vary a position of an interconnection of the primary and secondary cable parts with respective changes in the position of the member, and releasable means slidable over said elongate hollow body for retaining said compensation spring in a condition in which the control cable has a maximum extent to facilitate assembly.

9. A motor vehicle clutch control cable as defined in claim 8, wherein the clutch operating member has a curved forked end, and said secondary cable part has an end projecting beyond said elongate hollow body for engaging said curved forked end.

* * * * *